US005465086A

United States Patent [19]

[11] Patent Number: 5,465,086

[45] Date of Patent: Nov. 7, 1995

Gleeson et al.

[54] SELECTIVE CALL RECEIVER AND METHOD FOR INDICATING STATUS OF OPERATIONAL PARAMETERS WITH VOICE MESSAGES

[75] Inventors: John K. Gleeson, Boca Raton; David S. Fraklin, Boynton Beach, both of Fla.

[73] Assignee: Motorola, Inc., Schaumburg, Ill.

[21] Appl. No.: 258,916

[22] Filed: Jun. 13, 1994

Related U.S. Application Data

[63] Continuation of Ser. No. 871,520, Apr. 21, 1992, abandoned.

[51] Int. Cl.[6] ........ G08B 5/22; H04Q 7/00

[52] U.S. Cl. ........ 340/825.44; 379/88; 379/67; 455/67.7; 455/67.1

[58] Field of Search ........ 340/825.44; 379/67, 379/88; 455/67.1, 67.7; 381/86

[56] References Cited

U.S. PATENT DOCUMENTS

| | | | |
|---|---|---|---|
| 4,330,780 | 5/1982 | Masaki | 340/825.44 |
| 4,383,241 | 5/1983 | Kojima et al. | 381/86 |
| 4,480,253 | 10/1984 | Anderson | 340/825.69 |
| 4,498,078 | 2/1985 | Yoshimura et al. | 340/679 |
| 4,956,860 | 9/1990 | Murata | 379/88 |
| 4,965,569 | 10/1990 | Bennett et al. | 340/825.44 |
| 5,105,458 | 4/1992 | Takenaka | 379/67 |
| 5,127,047 | 6/1992 | Bell et al. | 379/88 |

FOREIGN PATENT DOCUMENTS

| | | | |
|---|---|---|---|
| 0297368 | 6/1988 | European Pat. Off. | G08B 3/10 |
| 2091924 | 1/1982 | United Kingdom | G08B 19/00 |
| 2254174 | 9/1992 | United Kingdom | G08B 27/00 |
| 8303737 | 10/1983 | WIPO | H05B 6/68 |
| 9013189 | 11/1990 | WIPO | H04B 17/00 |

OTHER PUBLICATIONS

Smith et al., Innere Stimone, 1981, Funkschau No. 13 pp. 47–49.

The Wrist Watch Pager, Motorola, Inc., 1990 (5 pages).

*Primary Examiner*—Donald J. Yusko
*Assistant Examiner*—Edward Merz
*Attorney, Agent, or Firm*—Kelly A. Gardner; John H. Moore; Daniel K. Nichols

[57] ABSTRACT

An electronic device having operational parameters comprises a receiver (11) for receiving a signal and a microprocessor (12) for monitoring (21) the status of the operational parameters. An output device (15) presents (31) a voice message when the status of one of the operational parameters exceeds a threshold.

14 Claims, 1 Drawing Sheet

SELECTIVE CALL RECEIVER AND METHOD FOR INDICATING STATUS OF OPERATIONAL PARAMETERS WITH VOICE MESSAGES

This is a continuation, of application Ser. No. 07/871,520, filed Apr. 21, 1992, now abandoned.

FIELD OF THE INVENTION

This invention relates in general to selective call receivers, and more specifically to a method and a selective call receiver for presenting a voice message.

BACKGROUND OF THE INVENTION

Electronic devices, such as paging receivers, alert the user when a message has been received. Such a device generally incorporates circuitry for monitoring operational parameters and alerting the user by visual indications or audible tones in a coded format when the status of one of the operational parameters exceeds a threshold. The user may be alerted, for example, when the battery drops below a specified voltage or when the pager is beyond the range of the base station. In one conventional paging receiver, when the status of one of the operational parameters exceeds a threshold, the user is alerted by an audible tone. The user of the paging receiver must, however, be familiar with the meaning of the tone before the tone can be interpreted. This problem is magnified when several different tones or combinations of different tones are used to indicate changes in more than one of the operational parameters. In this case, the user is expected to be able to associate a plurality of different tones with their meanings before he can respond to the status indicator. In another conventional paging receiver, a visible symbol or message is displayed on a presentation device, e.g., a liquid crystal display, to alert the user when the status of one of the operational parameters exceeds a threshold. The presentation of the visible status indicator may provide a problem for the user in that the user may not notice the status indicator until one of the operational parameters has critically exceeded a threshold. For example, if the user does not realize that the battery voltage has fallen below a specified level, the battery voltage may drop low enough that the memory of the paging receiver is lost.

In some automobiles, a pre-recorded voice message alerts the user when the status of one of the operational parameters has exceeded a threshold. When the pre-recorded voice message is presented, the user is immediately aware of the status of the corresponding operational parameter. However, the presentation of the pre-recorded voice message may be distracting or dangerous to the user in some situations. For example, the presentation of the voice message could jeopardize a policeman who is on patrol in a sensitive area.

SUMMARY OF THE INVENTION

An electronic device having operational parameters, including a receiver for receiving a radio frequency signal including information to be presented to the user. The information is unrelated to the operational parameters. A monitoring circuit monitors the status of the operational parameters, and a presentation device presents the information to the user and automatically alerts the user, without user input, when the status of one of the operational parameters exceeds a threshold. The user is alerted by a voice message corresponding to the operational parameter that exceeds the threshold. A timer delays, when the status of one of the operational parameters exceeds a threshold, presentation of the voice message until after presentation of the information included within the signal received by the receiving means, wherein the delayed voice message is presented to the user irrespective of the length of the information included within the signal.

DESCRIPTION OF THE PREFERRED EMBODIMENT

Figure 1:
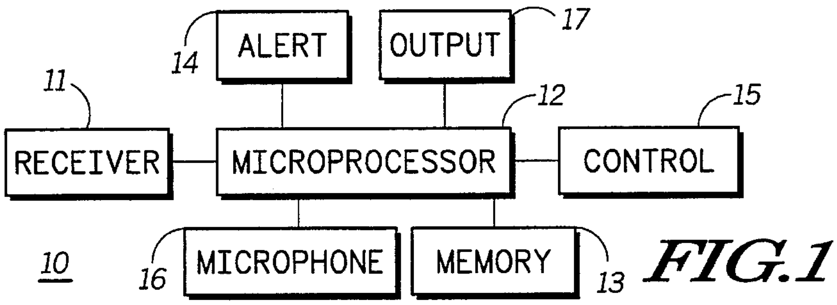
FIG. 1 is a block diagram in accordance with an embodiment of the present invention.

Referring to FIG. 1, an electronic device for receiving messages such as a selective call receiver 10 comprises a receiver 11 for receiving and demodulating signals. A memory 13 is coupled to the microprocessor 12 for storing those messages received by the selective call receiver 10 and for storing pre-recorded voice messages. The microprocessor 12 controls the storing and recalling of the messages and also monitors the status of operational parameters, e.g., battery voltage, in a manner well known to those skilled in the art. An alert device 14 coupled to the microprocessor 12 provides an alert to the user that a message has been received by the selective call receiver and is ready to be presented. An output device 15 coupled to the memory 13 and to the microprocessor 12 may be, for example, a speaker controlled by the microprocessor 12. The controls 17 allow the user to command the microprocessor 12 to perform various operations well known to those skilled in the art and may include switches to control functions such as turning on and off the selective call receiver 10, recalling a message received by the selective call receiver from the memory 13, silencing the alert 14, etc. An optional microphone 16 is coupled to the microprocessor 12 and to the memory 13 for recording the voice messages. Although the preferred embodiment is described as a selective call receiver, the invention described herein may be used with any type of receiver for presenting messages. The messages received by the selective call receiver, for example, could be sent without an address identifying specific receivers.

Figure 2:
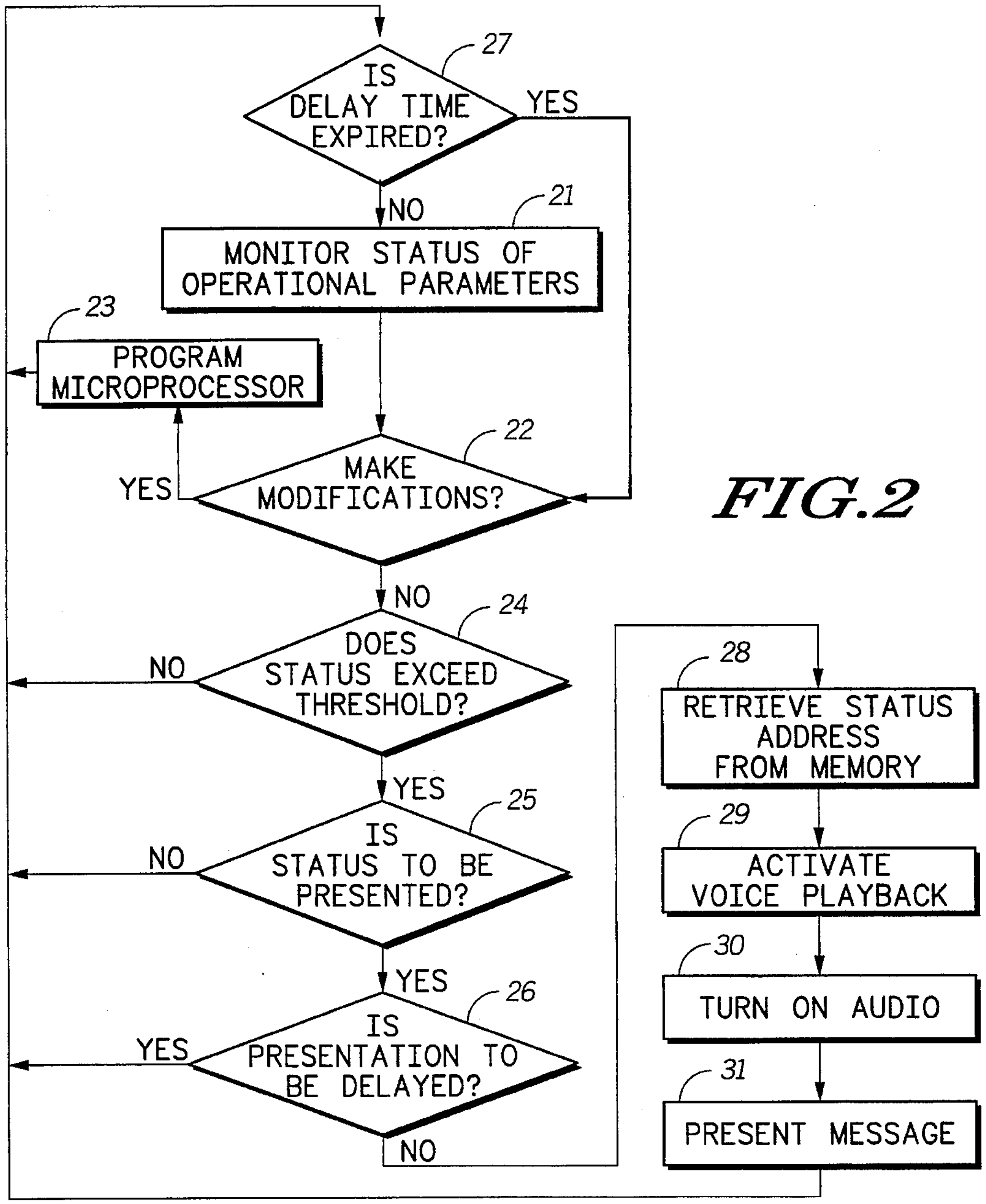
FIG. 2 is a flowchart illustrating an embodiment of the present invention.

Referring to FIG. 2, the method according to the preferred embodiment of the present invention comprises the microprocessor 12 monitoring 21 the status of the operational parameters in a manner well known to those skilled in the art. If the user chooses to make any modifications 22, the controls 17 are utilized to program 23 the microprocessor 12. In the preferred embodiment of this invention, the user is able to silence the presentation of the voice message, record a different voice message, and adjust the time interval of the periodic intervals between presentation of the voice message. If the status of one of the operational parameters exceeds a threshold 24 and the status is to be presented 25, the presentation of the status may be delayed 26 by reference to a timer 18 for a specified period of time, for example, if the selective call receiver 10 is presenting a received message on the output device 15. The microprocessor 12 continues to monitor 21 the status of the operational parameters if the presentation of the status has been delayed 26. When the delay-time has expired 27, the microprocessor 12 determines if the status of the corresponding operational parameter still exceeds a threshold 24. Once the status is to be presented 25, the microprocessor 12 retrieves 28 the address of the pre-recorded status message from memory 13 and activates 29 voice playback of the pre-recorded voice message. The microprocessor 12 turns on the audio 30, and the pre-recorded voice message is presented 31 on the output device 15.

By receiving a voice message when the status of one of the operational parameters exceeds a threshold, the user is immediately aware of any condition to which he may need to respond. Furthermore, because the user is able to modify several features of this invention, the user may customize the selective call receiver to better suit his application.

We claim:

1. An electronic device having operational parameters, comprising:

receiving means for receiving a radio frequency signal including information to be presented to the user, wherein the information is unrelated to the operational parameters;

monitoring means coupled to the receiving means for monitoring the status of the operational parameters; and audible means coupled to the monitoring means for presenting the information to the user and for automatically alerting the user, without user input, when the status of one of the operational parameters exceeds a threshold, the audible means generating a voice message corresponding thereto; and timing means coupled to the monitoring means for delaying, when the status of one of the operational parameters exceeds a threshold, presentation of the voice message until after presentation of the information included within the signal received by the receiving means, wherein the delayed voice message is presented to the user irrespective of the length of the information included within the signal.

2. The electronic device in accordance with claim 1, further comprising silencing means coupled to the monitoring means for preventing presentation of the voice message in response to a user initiated action.

3. The electronic device in accordance with claim 1, further comprising user actuated control means coupled to the monitoring means for selectively programming the operational parameters.

4. The electronic device in accordance with claim 1, further comprising user actuated control means coupled to the audible means for allowing the user to record the voice message that is presented when the status of one of the operational parameters exceeds a threshold.

5. The electronic device in accordance with claim 1, wherein presentation of the voice message automatically occurs at periodic intervals when the status of one of the operational parameters exceeds a threshold.

6. The electronic device in accordance with claim 5, further comprising user actuated control means coupled to the monitoring means for allowing the user to program the time of the periodic intervals at which the voice message pertaining to the same operational parameter is successively represented.

7. A selective call receiver having operational parameters, comprising:

a receiver for receiving a radio frequency signal including information to be presented to the user, wherein the information is unrelated to the operational parameters;

a microprocessor coupled to the receiver for monitoring the status of the operational parameters; and audible means coupled to the microprocessor for presenting the information received by the radio frequency signal and for automatically alerting the user, without user input, when the status of one of the operational parameters exceeds a threshold, the audible means generating a voice message corresponding thereto; and timing means coupled to the microprocessor for delaying, when the status of one of the operational parameters exceeds a threshold, presentation of the voice message until after presentation of the information included within the signal received by the receiver, wherein the delayed voice message is presented to the user irrespective of the length of the information included within the signal.

8. The selective call receiver in accordance with claim 7, further comprising silencing means coupled to the microprocessor for preventing presentation of the voice message in response to a user initiated action.

9. The selective call receiver in accordance with claim 8, further comprising user actuated control means coupled to the microprocessor for selectively programming the operational parameters.

10. The selective call receiver in accordance with claim 7, further comprising user actuated control means coupled to the audible means for allowing the user to record a corresponding voice message that is presented when the status of one of the operational parameters exceeds a threshold.

11.The selective call receiver in accordance with claim 10, wherein presentation of the voice message automatically occurs at periodic intervals when the status of one of the operational parameters exceeds a threshold.

12. The selective call receiver in accordance with claim 11, further comprising user actuated control means coupled to the microprocessor for allowing the user to program the time of the periodic intervals at which the voice message pertaining to the same operational parameter is successively re-presented.

13. In a selective call receiver having operational parameters, a method comprising the steps of:

(a) receiving a radio frequency signal including information to be presented to the user, wherein the information is unrelated to the operational parameters;

(b) monitoring the operational parameters;

(c) determining that one of the operational parameters exceeds a threshold;

(d) presenting, subsequent to step (c) and responsive to step (a), the information received in the radio frequency signal to the user;

(e) determining, after presentation of the information, that the one of the operational parameters continues to exceed the threshold; and (f) automatically alerting the user, without user input, with a voice message corresponding to the one of the operational parameters subsequent to step (d) and responsive to step (e), wherein the delayed voice message is presented to the user irrespective of the length of the information included within the radio frequency signal.

14. The method in accordance with claim 13, wherein presentation of the voice message automatically occurs at periodic intervals when the status of one of the operational parameters exceeds a threshold.

* * * * *